(12) United States Patent
Ravi et al.

(10) Patent No.: US 7,173,906 B2
(45) Date of Patent: Feb. 6, 2007

(54) FLEXIBLE CROSSBAR SWITCHING FABRIC

(75) Inventors: Srivaths Ravi, Princeton, NJ (US);
Anand Raghunathan, Plainsboro, NJ (US); Jacob Chang, San Jose, CA (US)

(73) Assignee: NEC Corporation, Tokyo (JP)

( * ) Notice: Subject to any disclaimer, the term of this patent is extended or adjusted under 35 U.S.C. 154(b) by 983 days.

(21) Appl. No.: 10/097,582

(22) Filed: Mar. 15, 2002

(65) Prior Publication Data
US 2003/0063605 A1 Apr. 3, 2003

Related U.S. Application Data

(60) Provisional application No. 60/325,166, filed on Sep. 28, 2001.

(51) Int. Cl.
H04J 1/16 (2006.01)
H04Q 11/00 (2006.01)
H04L 12/56 (2006.01)
H04L 12/54 (2006.01)
G06F 13/00 (2006.01)

(52) U.S. Cl. .................. 370/230; 370/386; 370/395.4; 370/413; 370/429; 710/317

(58) Field of Classification Search ............... None
See application file for complete search history.

(56) References Cited

U.S. PATENT DOCUMENTS

| | | | | | |
|---|---|---|---|---|---|
| 5,530,814 | A | * | 6/1996 | Wong et al. | 710/317 |
| 5,689,644 | A | * | 11/1997 | Chou et al. | 370/392 |
| 5,923,644 | A | * | 7/1999 | McKeown et al. | 370/230 |
| 6,160,812 | A | * | 12/2000 | Bauman et al. | 370/416 |
| 6,188,686 | B1 | * | 2/2001 | Smith | 370/388 |
| 6,735,212 | B1 | * | 5/2004 | Calamvokis | 370/412 |
| 6,757,246 | B2 | * | 6/2004 | Alasti et al. | 370/230 |

* cited by examiner

Primary Examiner—Chi Pham
Assistant Examiner—Melanie Jagannathan
(74) Attorney, Agent, or Firm—Sughrue Mion, PLLC

(57) ABSTRACT

A crossbar switching fabric comprising a plurality of crossbar input ports and a plurality of crossbar output ports. The traffic from at least one source is directed to more than one of the plurality of crossbar input ports. The traffic from more than one crossbar output port is directed to at least one destination.

16 Claims, 18 Drawing Sheets

| K | $T_{setup}$ | $T_{del}$ | $T_{cyc}$ | %Ovhd$_T$ |
|---|---|---|---|---|
| 1 | .26 | 2.07 | 2.33 | 0.0% |
| 2 | .24 | 2.29 | 2.53 | 8.23% |
| 4 | .42 | 2.29 | 2.71 | 16.28% |
| 8 | .63 | 2.29 | 2.92 | 24.98% |

FIG.11

| K | Tcyc | A | %Ovhd T | %Ovhd A |
|---|------|---|---------|---------|
| 1 | 5.36 | 116992 | 0% | 0% |
| 2 | 5.90 | 207369 | 10.07% | 77.25% |
| 3 | 6.55 | 3285564 | 22.20% | 180.84% |
| 4 | 6.73 | 5372289 | 25.60% | 359.25% |

FIG.12

FLEXIBLE CROSSBAR SWITCHING FABRIC

I.A. RELATED APPLICATIONS

This Application claims priority from co-pending U.S. Provisional Application Ser. No. 60/325,166, filed Sep. 28, 2001, which is incorporated in its entirety by reference.

I.B. FIELD

This disclosure teaches techniques for designing and using a crossbar switching fabric that provides improved performance and utilization. Specifically, simple hardware modification is proposed to enhance the performance of a generic crossbar is proposed. Apparatus and methods that implement these techniques are discussed herein.

I.C. BACKGROUND

1. References

The following papers provide useful background information, for which they are incorporated herein by reference in their entirety, and are selectively referred to in the remainder of this disclosure by their accompanying reference numbers in square brackets (i.e., <3> for the third numbered paper by S. Keshav et al.):

<1> K. G. Coffman and A. Odlyzko, "The size and growth rate of the internet," Tech. Rep. 99–11, $AT_T$, 1999.

<2> J. Aweya, "Ip router architectures: An overview," tech. rep., Nortel Networks, 1999.

<3> S. Keshav and R. Sharma, "Issues and trends in router design." IEEE Commun. Mag., pp. 144–151, May 1998.

<4> N. McKeown, N. Izzard, A. Mekkittikul, W. Ellersick, and M. Horowitz, "Tiny tera: A packet switch core," IEEE Micro, pp. 26–33, January/February 1997.

<5> N. McKeown, "The iSLIP scheduling algorithm for input-queued switches," IEEE/ACM Transactions on Networking, vol. 7, pp. 188–201, April 1999.

<6> R. Naik and D. Walker, "Large integrated crossbar switch," IEEE 1995 International Conference on Wafer Scale Integration, pp. 217–227, 1995.

<7> K. Chang, S. Chuang, N. McKeown, and M. Horowitz, "A 50 gb/s 32×32 cmos crossbar chip using asymmetric serial links," 1999 Symposium on VLSI Circuits Digest of Technical Papers, pp. 19–22, 1999.

<8> Y. Oie, T. Suda, M. Murata, D. Kolson, and H, Miyahara, "Survey of switching techniques in high-speed networks and their performance," Proc. IEEE Infocom Jun. 5–7, 1990, vol. 3, pp. 1242–1251, 1990.

<9> P. Gupta, Scheduling in input queued switches: A survey," tech. rep., Standford University, June 1996.

<10> Y. Tamir and G. Frazier, "High-performance multi-queue buffers for VLSI communication switches," 15th Annual International Symposium on Computer Architecture, pp. 343–354, 1988.

<11> R. Schoenen, G. Post, and G. Sander, "Weighted arbitration algorithms with priorities for input-queued switches with 100% throughput," in 3rd IEEE International Workshop on Broadband Switching Systems (BSS '99), June 1999.

<12> N. McKeown, A. Mekkittikul, V. Anantharam, and J. Wairand, "Achieving 100% throughput in an input-queued switch," IEEE Transactions on Communications, pp. 296–302, August 1999.

<13> P. Gupta and N. McKeown, "Designing and implementing a fast crossbar scheduler," IEEE Micro, pp. 20–28, January-February 1999.

<14> L. Peterson and B. Davie, Computer Networks: A Systems Approach. Morgan Kaufmann Publishers, 1996.

<15> T. Jonathan, "Terabit burst switching," Tech. Rep. WUCS-97–49, Washington University, 1997.

<16> J. Turner, Design and Analysis of Switching Systems, Morgan Kaufmann Publishers, 2001.

2. Introduction

There is an increasing demand for improving the performance of communication network infrastructure. Specifically so when increasing numbers of users and applications require connectivity resources beyond the existing limits. For example, the band-width usage in the Internet doubles every six to twelve months <1>. This increasing demand has motivated researchers to improve the performance of switching and transmission technologies. Of particular interest to researchers has been the router. A variety of sophisticated control mechanisms have been conventionally proposed to perform the tasks of route processing, packet forwarding and other services more efficiently <2>. However, the improvements in performance from complex algorithms have come at very high implementation costs or under special traffic scenarios.

The core of the router is the switching fabric, for which many architectures have been proposed. Of these, the crossbar is a popular choice for mid- to high-end switches, because of its low cost, good scalability, and non-blocking properties <3, 4>.

A n*n crossbar can be described as a switching element that allows physical connection between any of the n inputs and any of the n outputs of the crossbar. One of the properties of such a crossbar which provides an n*n connectivity is that internal blocking does not occur. In such a crossbar, the crossbar fabric itself is modular, easy to implement, and offers relatively low latency. Although the switching fabric has maximum number of crosspoints between inputs and outputs and the associated state-of-the-art schedulers allows 100% through-put <5>, the realized utilization of the crossbar depends on the traffic and the size of the input queues. When more than one of the inputs to the n*n crossbar does not experience have heavy traffic, the utilization of the crossbar drops correspondingly. Also 100% throughput cannot be achieved without significant packet loss for finite input queue sizes.

3. Related Work

In this sub-section, issues relevant to a conventional crossbar-based switch design; physical design aspects, buffering strategies and crossbar control mechanisms are discussed. Further, problems and limits of conventional designs and scope for improvements therein are identified.

a) Physical Design Aspects

Conventional crossbar design provides for buffering and pipelining of the data lines in the switch using dynamic logic <6>. However, since the scheduler and not the physical crossbar switch is the bottleneck in the crossbar based router <3, 4>, the crossbar implementation used in the Tiny-tera chip <7> is focussed on. Such a crossbar, as in a Tiny-tera chip, is implemented as 32 32-to-1 static multiplexors connected in parallel. Each 32-to-1 multiplexor is, in turn, implemented by a series of three multiplexors to alleviate the self-loading problem. This is done by reducing the total number of tri-state multiplexors on the same output wire.

b) Buffering Strategies

Without buffers, even a non-blocking switch fabric like the conventional crossbar switch can offer only 63.2% throughput at the expense of 36.8% packet drop rate. Such a performance is unacceptable for ATM networks <8>. With the crossbar fabric, output buffering is not necessary if the crossbar operates at the speed of the output ports because a maximum of one cell per output is transmitted through the switch. To avoid dropping packets when contention arises from packets trying to reach the same destination from different sources, input buffering is needed.

A typical problem that arises with input buffering in a first-in-first-out (FIFO) queue is the head-of-line (HOL) blocking. If the first packet in the queue cannot be scheduled through the cross-bar switch because of output contention, it blocks that port even though it is possible that some other packet destined for a different port may be scheduled <9>. This problem of HOL blocking is eliminated by using the conventional scheme knows as Virtual Output Queuing (VOQ). In this scheme, n output queues for each input are used for a total of n*n queues <4, 10>.

c) Scheduler

Although the crossbar fabric with VOQ queuing can potentially achieve a 100% throughput for a network switch, the throughput additionally depends on the scheduling algorithm used and the traffic pattern under consideration <11, 12>. The scheduler configures the crossbar to specify the effective connections between the input ports and the output ports. A scheduling algorithm is considered to be a stable scheduling algorithm when the scheduler is able achieve a scheduling rate, for packets going through the crossbar, that exceeds the packet arrival rate. The throughput is the maximum packet arrival rate the scheduler can accept without causing it to be unstable.

The conventional iSLIP algorithm is able to achieve 100% throughput (verified with simulation)<5, 12> for independent, uniform traffic. iSLIP is also simple enough to be implemented as a practical scheduling algorithm <13>.

d) Problems Related to Conventional Crossbar Switches

As mentioned previously, the crossbar fabric has $n^2$ crosspoint resources and at a given instant of time, some crosspoints are in high demand while other crosspoints are in low demand. Such an asymmetry in workload is typical of bursty traffic. Network traffic is termed bursty when a series of packets must be routed from a certain port to another port over a time-frame with virtually no corresponding incoming packets at other times. During periods of high demand, a bottleneck is formed in the crosspoint resource of interest although other crosspoint resources stay idle. Hence, long latencies are expected in bursty traffic scenarios for packets waiting in queues.

In other conventional crossbar designs like the knockout switch wherein assumptions are made about the traffic to reduce the complexity of the output ports, thereby creating a not so "perfect" crossbar <14>. There are other self-routing fabrics like batcher networks that are flexible but require greater overheads. The need to pay special attention to bursty traffic scenarios has been emphasized in many conventional designs including those described in <15>. To handle short bursts efficiently, the burst switching architecture proposed in <15> first treats a wavelength division multiplexing (WDM) link as a shared re-source rather than a collection of independent channels and then uses future resource availability to assign data bursts to channels and/or storage locations.

However, it will be advantageous to use idle resources by directing the traffic through the idle ports when one port is highly utilized. In this way, bandwidth as seen from the highly utilized port can be decreased while decreasing the latency associated with the packets waiting in the queue. From a hardware perspective, it will be advantageous to use a greater percentage of the cross-point resources that can be better shared among the different ports leading to better utilization and better performance. This is true not only in bursty traffic scenarios but also in uniform traffic cases. In the latter, with the randomness of the traffic, it will be advantageous to achieve performance improvement because of the increase in flexibility in distributing the crossbar resources. Likewise, it will be advantageous to use crossbar ports as a resource that can be shared by traffic with minimum hardware changes

II. SUMMARY

The disclosed teachings are aimed at realizing some of the advantages and solving some of the problems noted above.

According to an aspect of the disclosed teachings, there is provided a crossbar switching fabric comprising a plurality of crossbar input ports and a plurality of crossbar output ports. The traffic from at least one source is directed to more than one of the plurality of crossbar input ports. The traffic from more than one crossbar output port is directed to at least one destination.

In an enhancement, an input flexibilty layer is inserted between the traffic sources the crossbar input ports.

In another enhancement an input flexibilty layer is inserted between the traffic sources the crossbar input ports.

In yet another enhancement, if $src_i$ represents one source and $inp_i$ are plurality of inputs corresponding to the plurality of input ports and k represents a level of flexibility, then traffic is directed in such a way that $src_i$ is directed to all inputs corresponding to $inp_i \ldots inp_{i+k}$.

In a further enhancement, if i+k exceeds the number of inputs, then traffic is wrapped around by redirecting traffic intended for inputs corresponding to i+k that exceed the number of inputs to inputs 1 . . . i.

In an alternate enhancement, if $src_i$ represents one source and $inp_i$ are the plurality of inputs corresponding to the plurality of input ports, n represents the number of inputs and k represents a level of flexibility, then traffic is directed in such a way that $src_i$ is directed to all inputs corresponding to $inp_i \ldots inp_{max(i+k,n)}$.

In a further enhancement, sources known to have less traffic are designated to be last n−k+2 sources, where n is a number of sources and k is a level of flexibility.

In yet another enhancement, the fabric comprises an input flexibility layer including at least one multiplexer connected to one of the plurality of input ports.

In still another enhancement, the fabric comprises an input flexibility layer including at least one multiplexer connected to one of the plurality of output ports.

In a still further enhancement, the multiplexer is a tri-state buffer.

In a still further enhancement, flexibility is implemented by varying a size of the multiplexer.

Anther aspect of the disclosed teachings is a crossbar switching fabric comprising a plurality of crossbar input ports wherein traffic from at least one source is directed to more than one of said plurality of crossbar input ports.

A further aspect of the disclosed teachings is a crossbar switching fabric comprising a plurality of crossbar output ports wherein traffic from at least one crossbar output port is directed to at least one destination.

Yet another aspect of the disclosed teachings is a method of scheduling for a flexible crossbar switch comprising generating $k^2$ requests for each routing request coming from an input source, wherein k corresponds to a level of flexibility offered by the crossbar switch. The requests for a same route are combined. Then the requests are sent to a crossbar scheduler. Finally, arbitration is performed between requests from different ports making a request, if a connection corresponding to the request is granted.

In a further enhancement, a priority scheme is used in arbitrating.

In a still further enhancement, the priority scheme takes into account a quality of service required.

III. BRIEF DESCRIPTION OF THE DRAWINGS

The above objectives and advantages of the disclosed teachings will become more apparent by describing in detail preferred embodiments thereof with reference to the attached drawings in which:

FIG. 1 shows a basic architecture for an example implementation of the disclosed techniques.

FIGS. 2(a)–(b) show a layout of the example implementation using 0.3 μm technology with modifications to the input buffer.

Figure 8A:
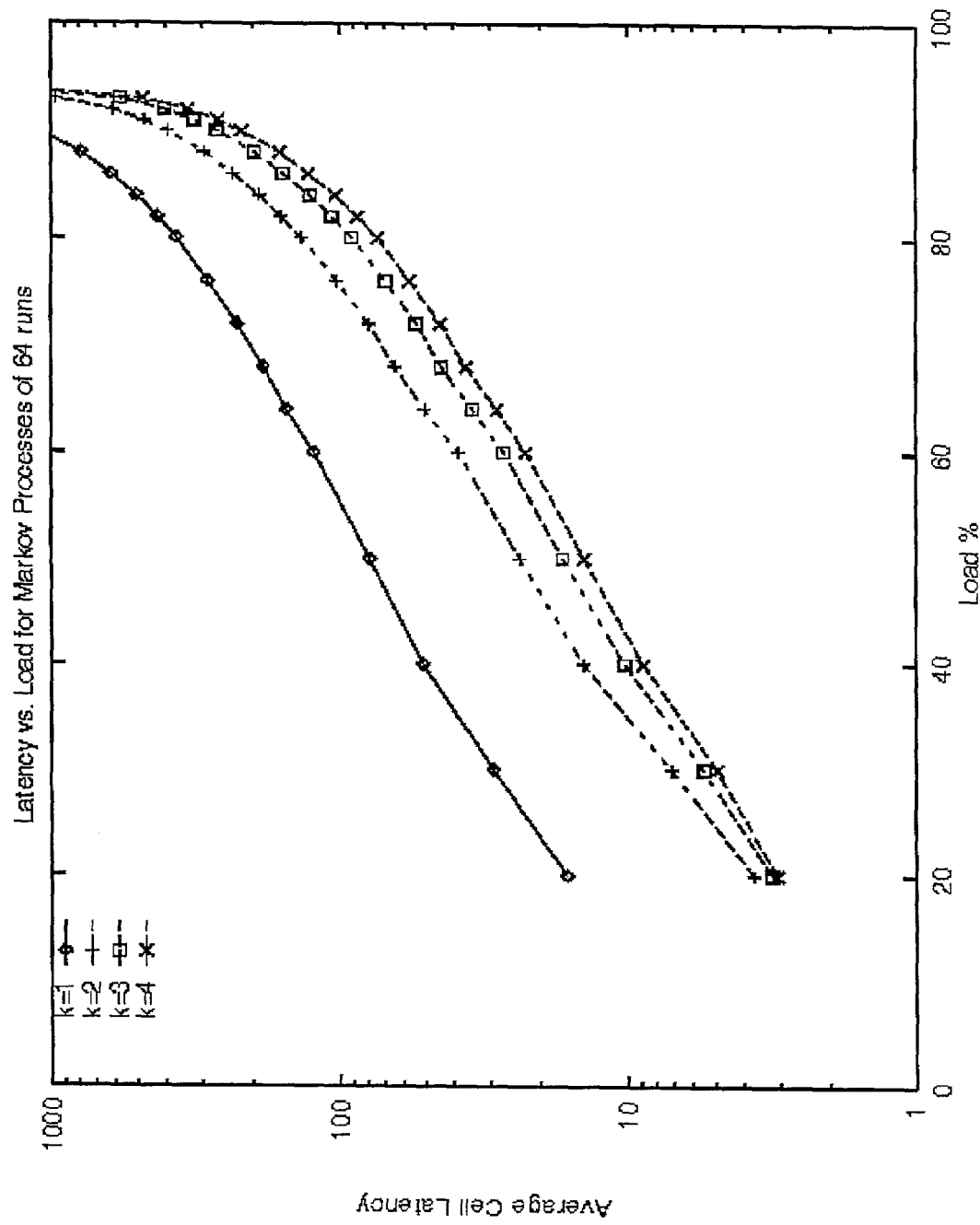
Figure 8B:
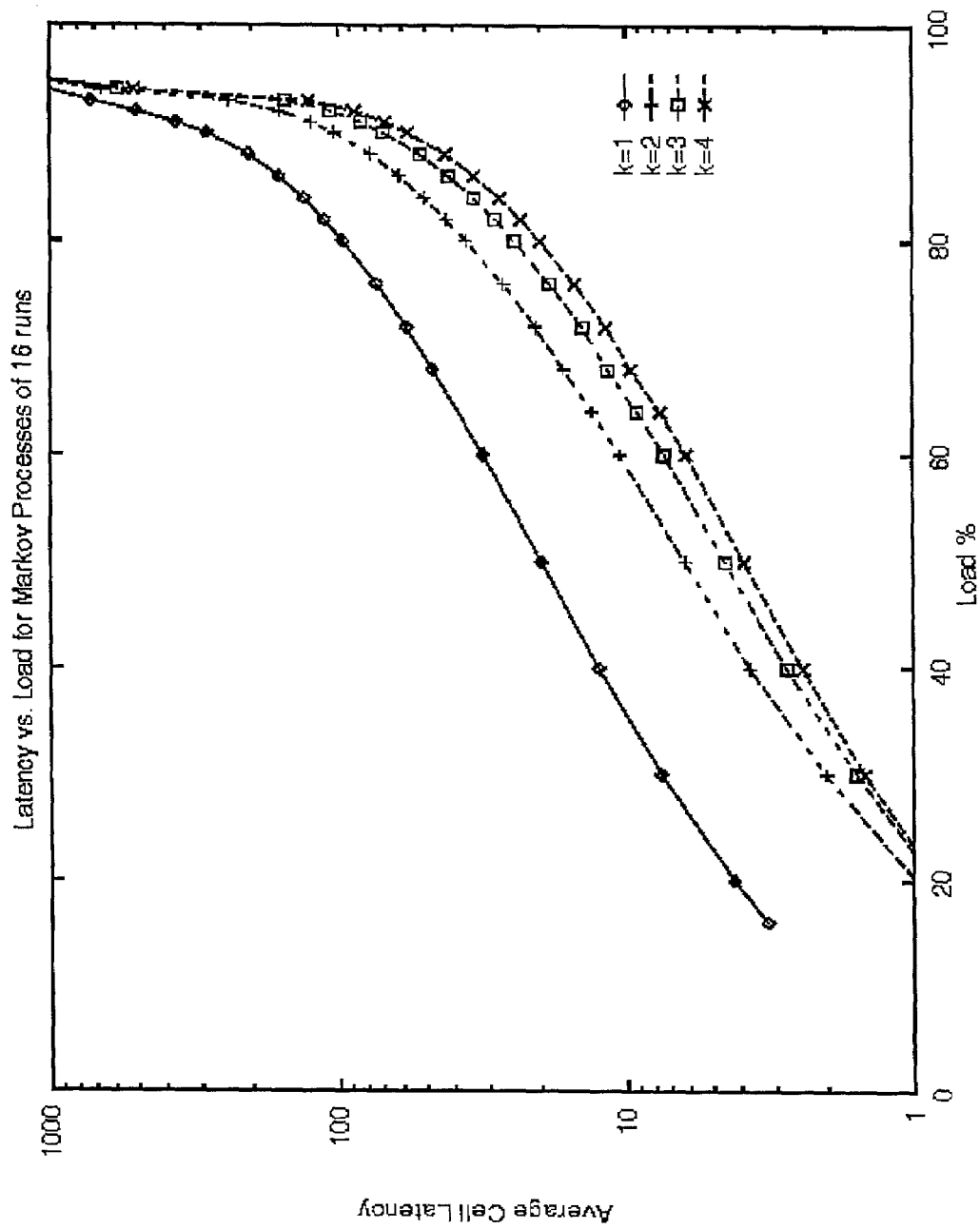
Figure 8:
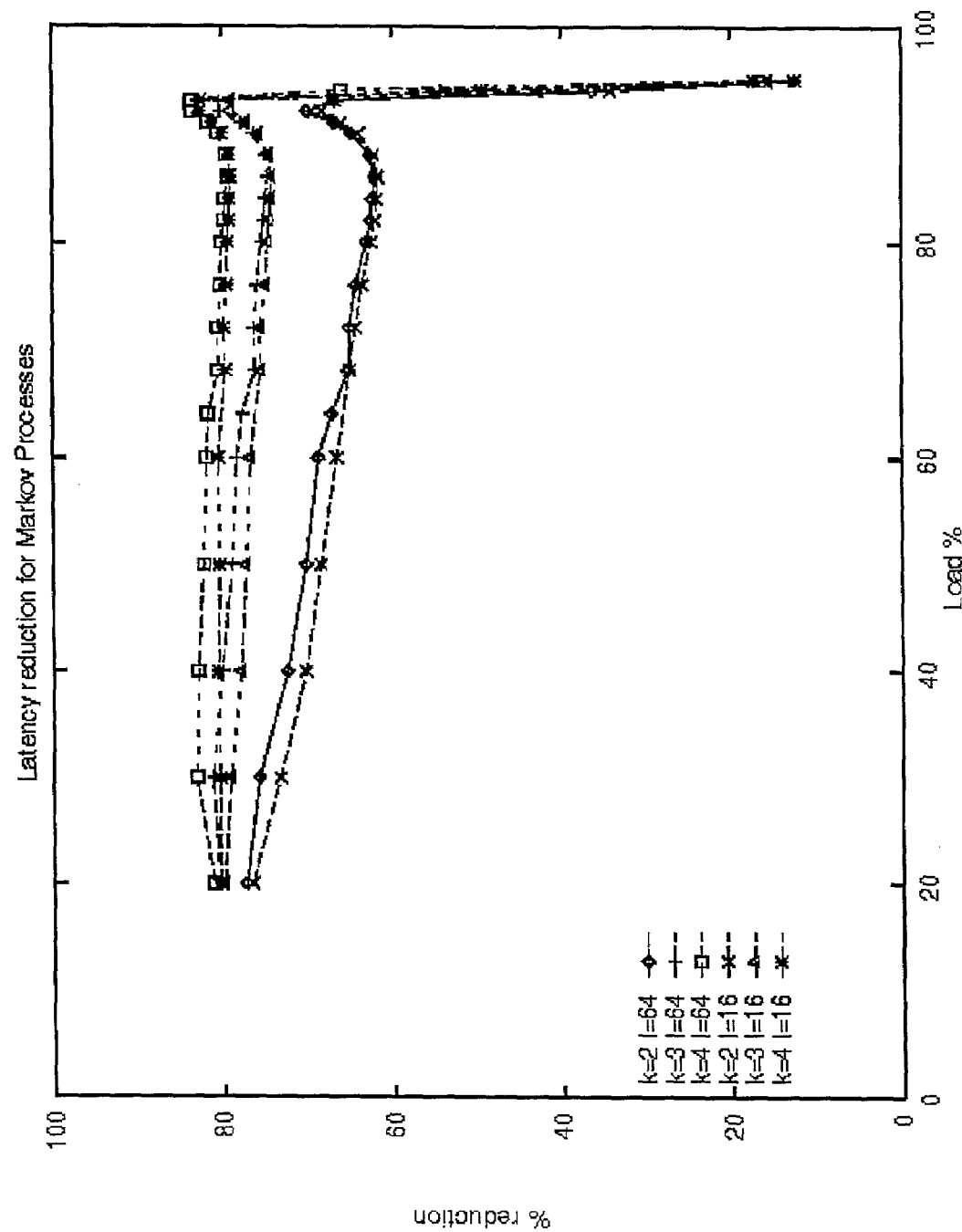

FIGS. 8(a)–(c) shows latency characteristics under bursty traffic with burst lengths (a) 64 and (b) 16, and (c) the associated latency improvements.

Figure 9:
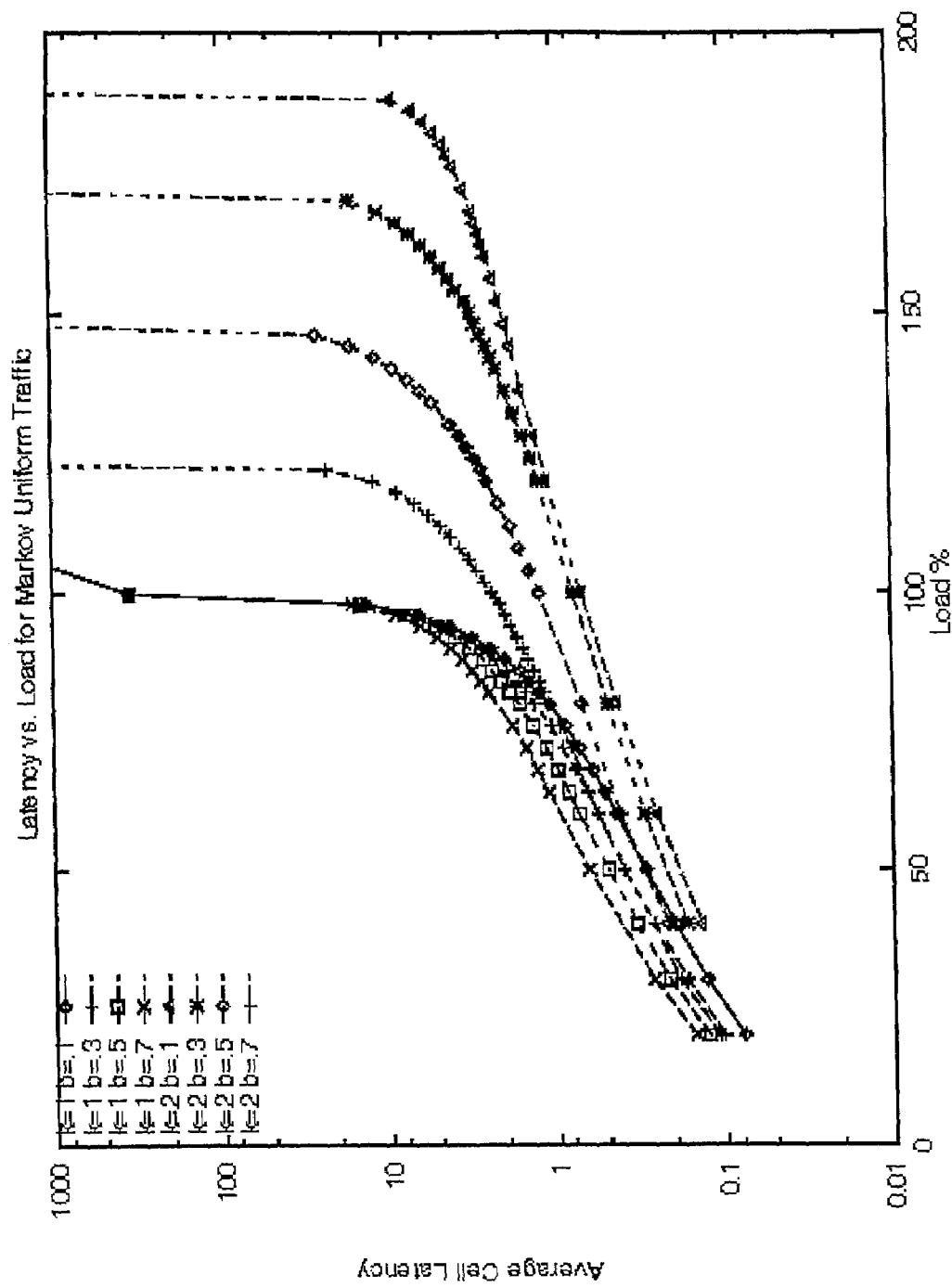

FIG. 9 shows a graph depicting latency characteristics of uniform traffic which fast I/O ports.

Figure 10:
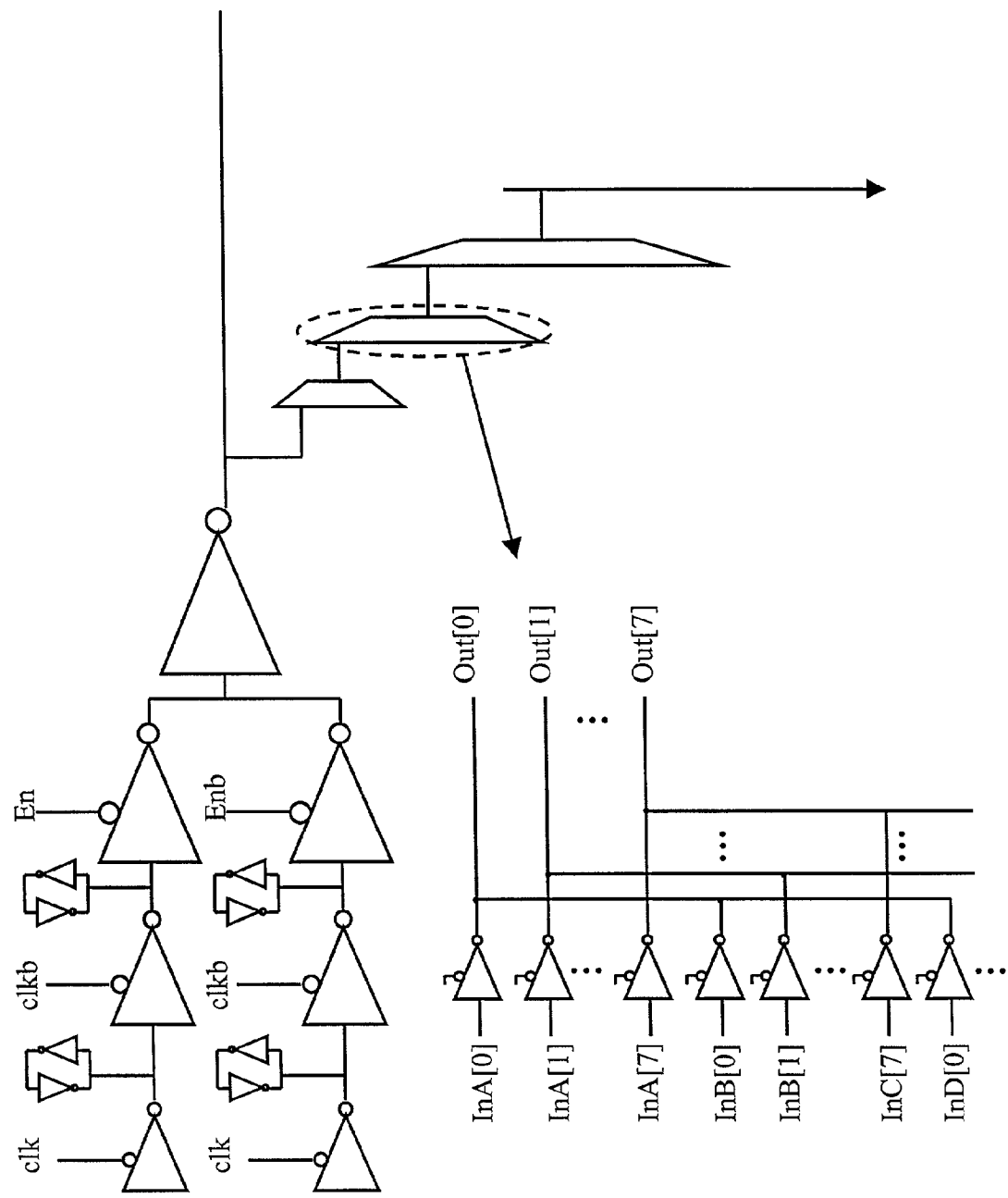

FIG. 10 shows logic design for the crossbar slice in the example implementation.

FIG. 11 shows Table.1 depicting cycle time results for the example implementation.

FIG. 12 shows Table.2 depicting schedule area and cycle time statistics.

IV. DETAILED DESCRIPTION

IV.A. Synopsis

A simple modification to the generic crossbar fabric is provided. The modification results in improving the overall utilization and performance of the crossbar. It is observed that the crossbar input and output ports are resources that can be shared by incoming traffic rather than be treated as independent entities. The disclosed techniques contemplate making the input and output ports configurable to implement the proposed enhancement. By making no modifications to the crossbar interiors, the modifications remain non-intrusive and independent of the original crossbar design. The scheduler needed to support this architecture is built to be a simple overlay on top of a generic crossbar scheduler.

While the proposed enhancement can benefit many applications, experimental tests performed within the context of a network switch are presented in this disclosure as an exemplary non-limiting illustration of the advantages. These experimental results indicate that latency of the switch can be improved by 60% to 70% under bursty traffic and up to 54% under uniform traffic. The throughput increases beyond 100% under common exemplary traffic scenarios. The measured hardware overheads are extremely small—The cycle time of the crossbar increases by 8% and that of the scheduler by 10%.

The disclosed techniques enhances the crossbar switching fabric to better utilize the native switching paths and achieve higher throughput while incurring minimal hardware overheads. The scheme allows more than one physical connection between an input port and an output port by making the input and output ports reconfigurable to route packet from more than one input source to route packet to more than one output destination. By making no modifications to the crossbar interiors, the modifications remain non-intrusive and independent of the original crossbar design.

There are different methods to minimize the hardware costs associated with the new design. The crossbar can be pipelined to incur minimal impact on the cycle time. If the extra pipeline stage is not desirable, the crossbar cycle time increased by 8% in order to bring about the improvement stated above. The scheduler cycle time increased by 10% for the new architecture.

An exemplary embodiment called FLEXBAR is discussed in further detail. It should be noted that FLEXBAR is merely an architecture that embodies the disclosed teachings and is not meant to limit the scope of the disclosed teachings in any manner.

IV.B. FLEXBAR

An overview of the FLEXBAR architecture is discussed in subsection IV.B.1 The issues involved in its physical design as well as the necessary modifications to a generic crossbar scheduler are presented in subsections IV.B.2 and IV.B.3. respectively. The potential benefits and limitations of the FLEXBAR design is discussed in sub-section IVB.4.

1. Defining the FLEXBAR Architecture

Figure 1:
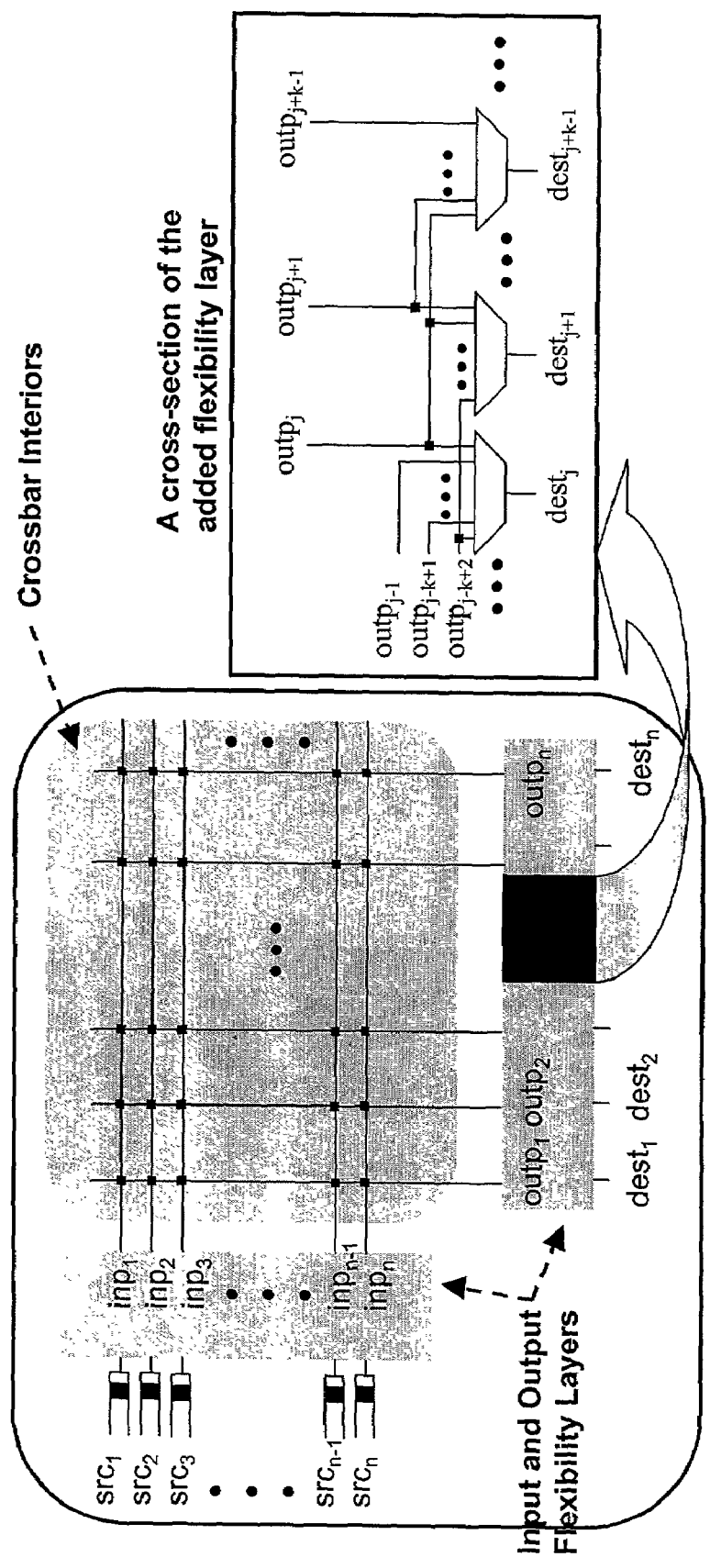

FIG. 1 shows the basic architecture of FLEXBAR which is an n*n crossbar enhanced using the disclosed teachings. Each traffic source is connected to more than one input ports of the crossbar through lightweight hardware layers. Likewise, each traffic destination is connected to more than one output ports of the crossbar through lightweight hardware layers. The traditional crossbar connectivity can be defined as a one-to-one mapping $src_i \rightarrow inp_i$, $outp_j \rightarrow dest_j \forall i,j=1 \ldots n$ where $src_i$ ($dest_j$) are traffic sources (destinations), and $inp_i$ ($outp_j$) are the crossbar input (output) ports. In FLEXBAR, the connectivity becomes $src_i \rightarrow \{inp_i, \ldots, inp_{(i+k-1) mod n}\}$, $$\{outp_j, \ldots, outp_{(j+k-1) mod n}\} \rightarrow dest_j \forall i,j=1 \ldots n$$

The parameter k determines the flexibility of FLEXBAR. In this scenario, it should be noted that the conventional crossbars can be considered to have a flexibility of one. To keep hardware overheads minimal, it is preferable to connect a traffic source/destination to k adjacent crossbar ports as de-fined above. Note that FLEXBAR with adjacent connectivity preserves the symmetry and regularity of a conventional crossbar network, enabling efficient hardware implementation (layout), easy scalability to large port counts, and easy implementation of fair traffic scheduling policies. The traffic source $src_i$ and traffic destinations $dest_j$ will henceforth be referred to as router ports and crossbar input $inp_i$ and output $outp_j$ as crossbar ports.

2. Physical Design Aspects

Few changes have been made to the conventional crossbar layout to support the additional connections while keeping the performance penalty for the modified crossbar design at a minimum. The conventional crossbar layout used as a basis for the improvement presented by FLEXBAR is a 32×32 CMOS crossbar switch built for the Tiny-tera chip project <7>. The limiting factor in this design is the wiring capacitance for both the input and the output wires that run across the entire crossbar core. Since the multiplexors are 8-bit wide, they are implemented as tri-state buffers driving wires that span across the 8 bit inputs as shown in FIG. 10. This reduces the wiring needed for input routing. Another factor to be considered is that the crossbar inputs are long wires that span across the whole physical crossbar and, thus, have large capacitance. Therefore, a series of inverter buffers are required to drive the input lines in the crossbar switch. These input buffers are also part of the input flip-flop shown in FIG. 10.

Figure 2A:
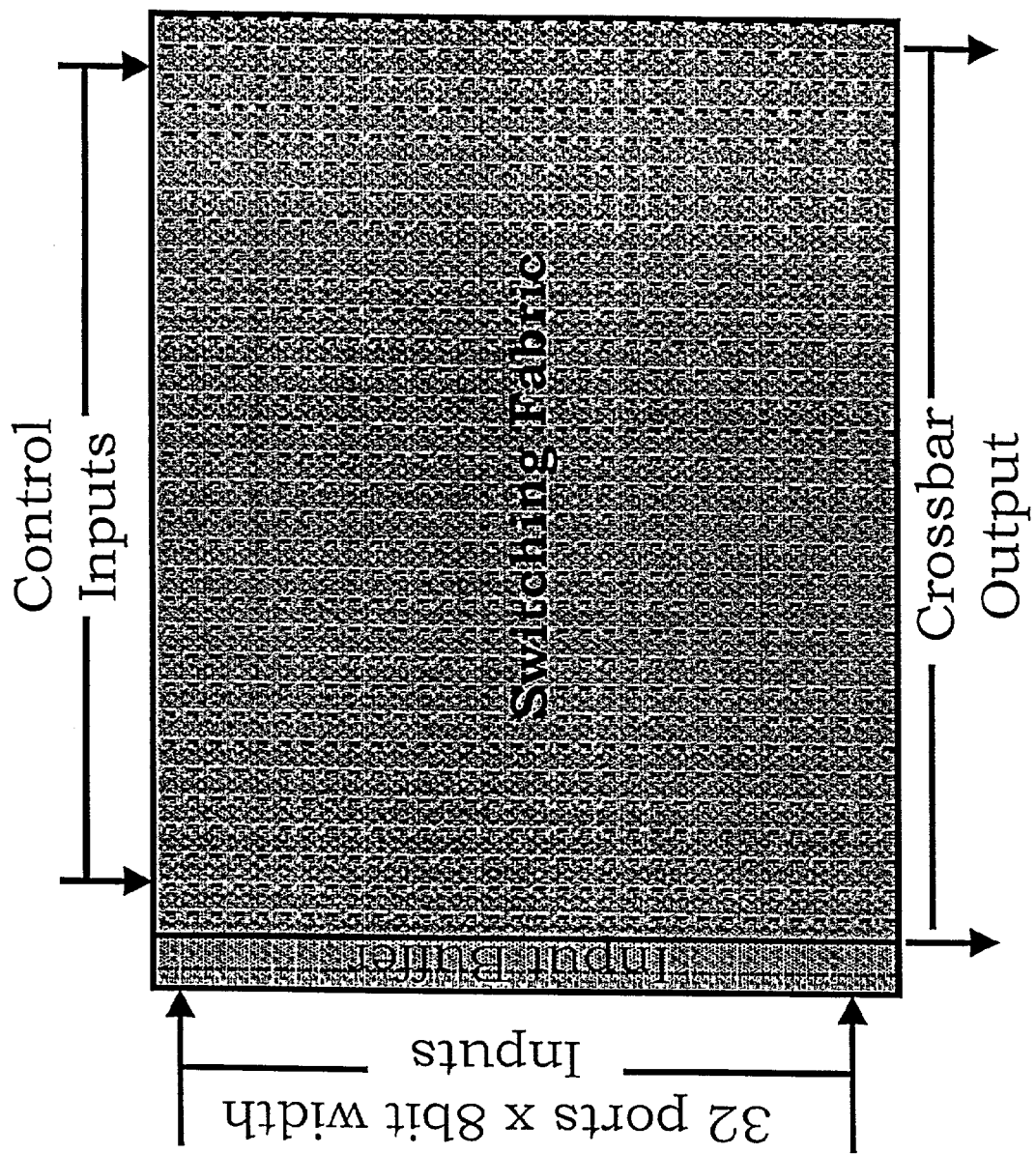
Figure 2:
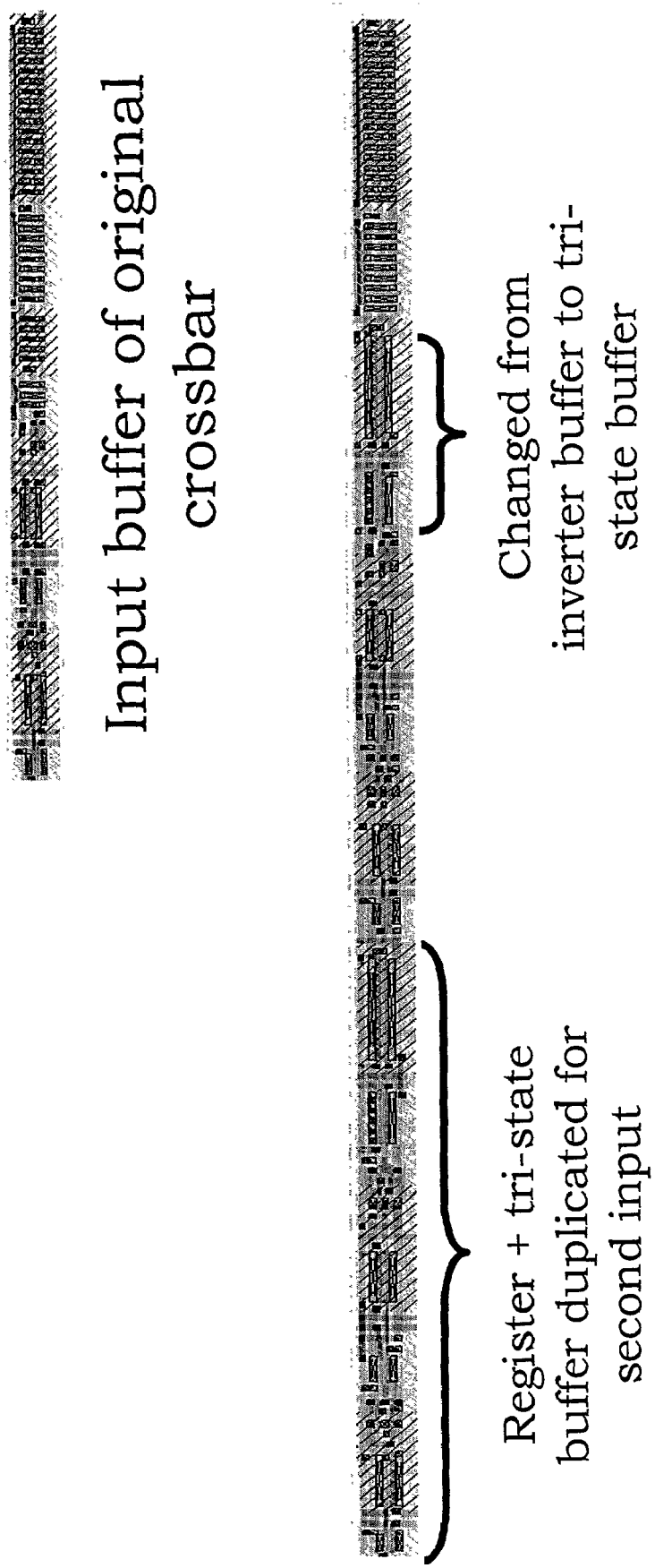

To extend the conventional crossbar to support the disclosed input and output flexibility, multiplexors are needed at each input and output crossbar port to select the appropriate input source and output destination. The size of this multiplexor is dependent on the amount of flexibility desired. For incorporating 2-flexibility (each input source to the switch can choose between two input ports of the crossbar switch and, likewise, for outputs), only one 2-to-1 multiplexor is needed for each input and output. In this case, the input buffer inverter is modified so that it becomes a tri-state inverter. This circuit is then duplicated for other inputs to the multiplexor as shown in FIG. 2(b). The buffers are, subsequently, resized for optimal speed. Even with these changes, the bit slice height associated with the conventional crossbar layout could be maintained. Though the size of the layout for the input buffer doubles, the increase in area is small compare to the overall size as seen in FIGS. 2(a)–(b).

In the actual layout of FLEXBAR, separate inputs are provided to each crossbar input port in order to support faster rate of input (instead of having one line for each network port that fans out to the different crossbar input ports). Similarly, there are now n*k output lines to double the output port rate (n=number of ports=32, k=flexibility=2). For flexibility of more than one, additional multiplexers are aided to the logic.

The last rows of FLEXBAR need some special consideration during layout. If the connectivity is defined as $srci \rightarrow inpi \ldots inp_{(i+k) mod n}$, wrap-around connections need to be provided from the last rows to the first rows as defined by k. The layout of such a scheme requires long wires that run back to the first row, which is undesirable. An efficient alternative is to reduce the flexibility of the last few rows so that the connectivity becomes $srci \rightarrow inpi \ldots inp_{max(i+k,n)}$. As a result, the performance of the last k−1 rows will be less than nominal. This is acceptable if a prior knowledge exists that there are a few ports with very little traffic, which can then be assigned to the last few rows. Alternatively, we can also increase the crossbar size by k−1 to support the extra connectivity of the last few rows. Since k is usually much smaller than n, the performance degradation using this technique is minor. At the same time, the performance of the last rows will increase as the last rows will not have to contend for the extra rows that were made available to it. In our simulations and our scheduler, we used the scenario, wherein, flexibility of the last few rows are reduced. Better performance can be expected, both in traffic contention and in the performance of the scheduler, the latter approach of extending the flexibility of crossbar switch is followed.

The overhead associated with the added flexibility can be eliminated if more pipeline stages are added to the crossbar design. However, this will increase the latency of the packet through the crossbar switch. But as shown by the experimental results presented later, the latency improvement of the architecture according to the disclosed techniques is much greater than the potential latency introduced by having the pipelined crossbar switch at traffic loads of interest.

3. Modifying a Generic Crossbar Scheduler to Support FLEXBAR

The additional flexibility now available at the input and the output ports can be tapped by making the (traditional) scheduler consider the additional routing paths available to FLEXBAR. During this process, care must be taken to ensure that the hardware overheads incurred while modifying the scheduler do not degrade the overall switch performance. Sophisticated scheduling algorithms in data network routers often fail because they require hardware implementations that add considerable overheads to the design's critical paths <3,4>.

The scheduling problem can be formulated for FLEXBAR by solving it as the composition of two problems: (a) The traditional problem of efficient packet scheduling for a crossbar switch, and (b) the additional task of utilizing the flexibility of the FLEXBAR. In solving part (b) of the problem, the router requests are reformulated and converted to the traditional crossbar scheduling problem. Then the obtained information concerning the scheduling grants for the crossbar ports for the traditional schedule is used to determine a suitable schedule for router requests.

Figure 3:
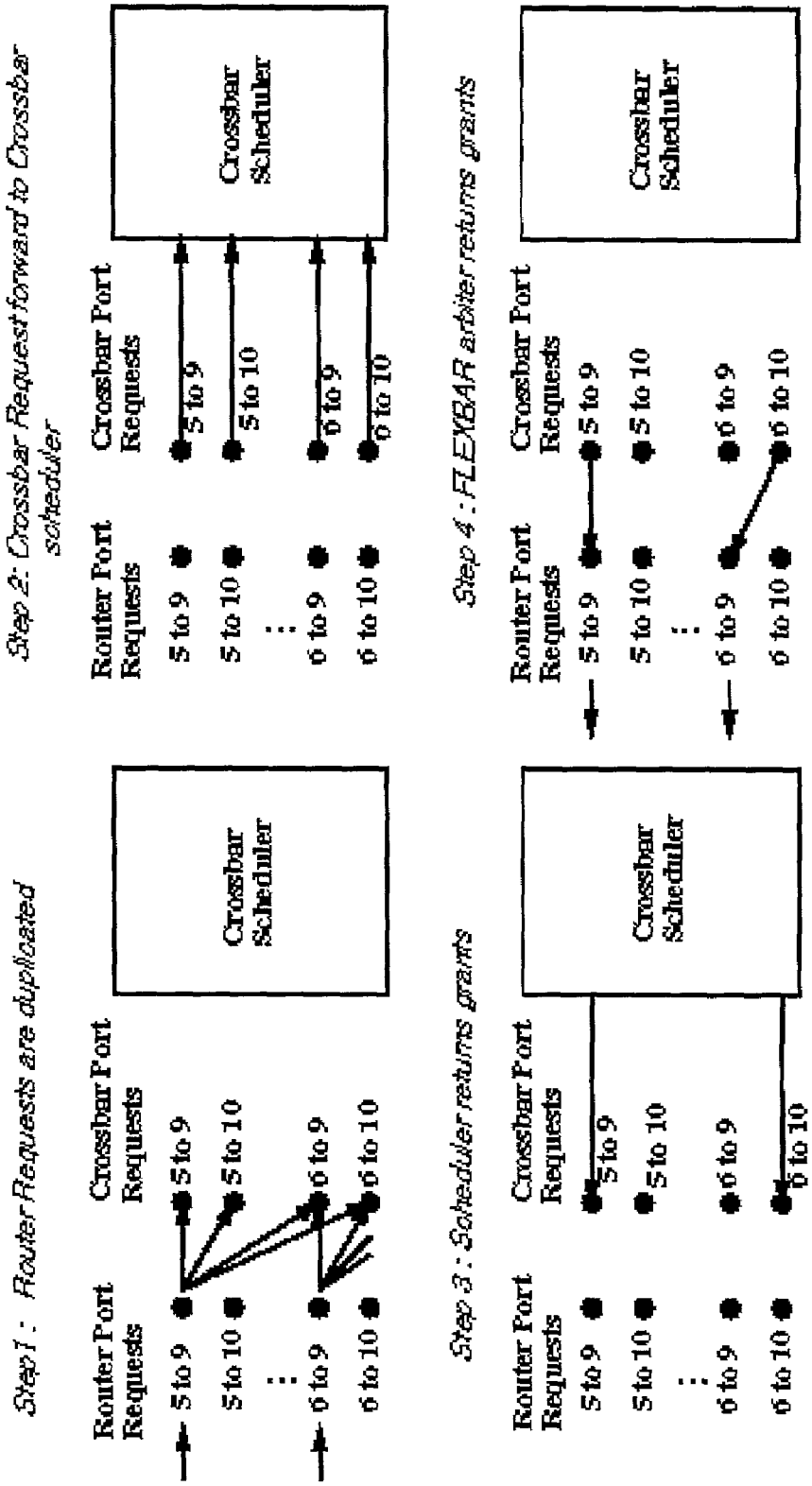
FIG. 3 shows a scheduler for the example implementation.
Figure 4:
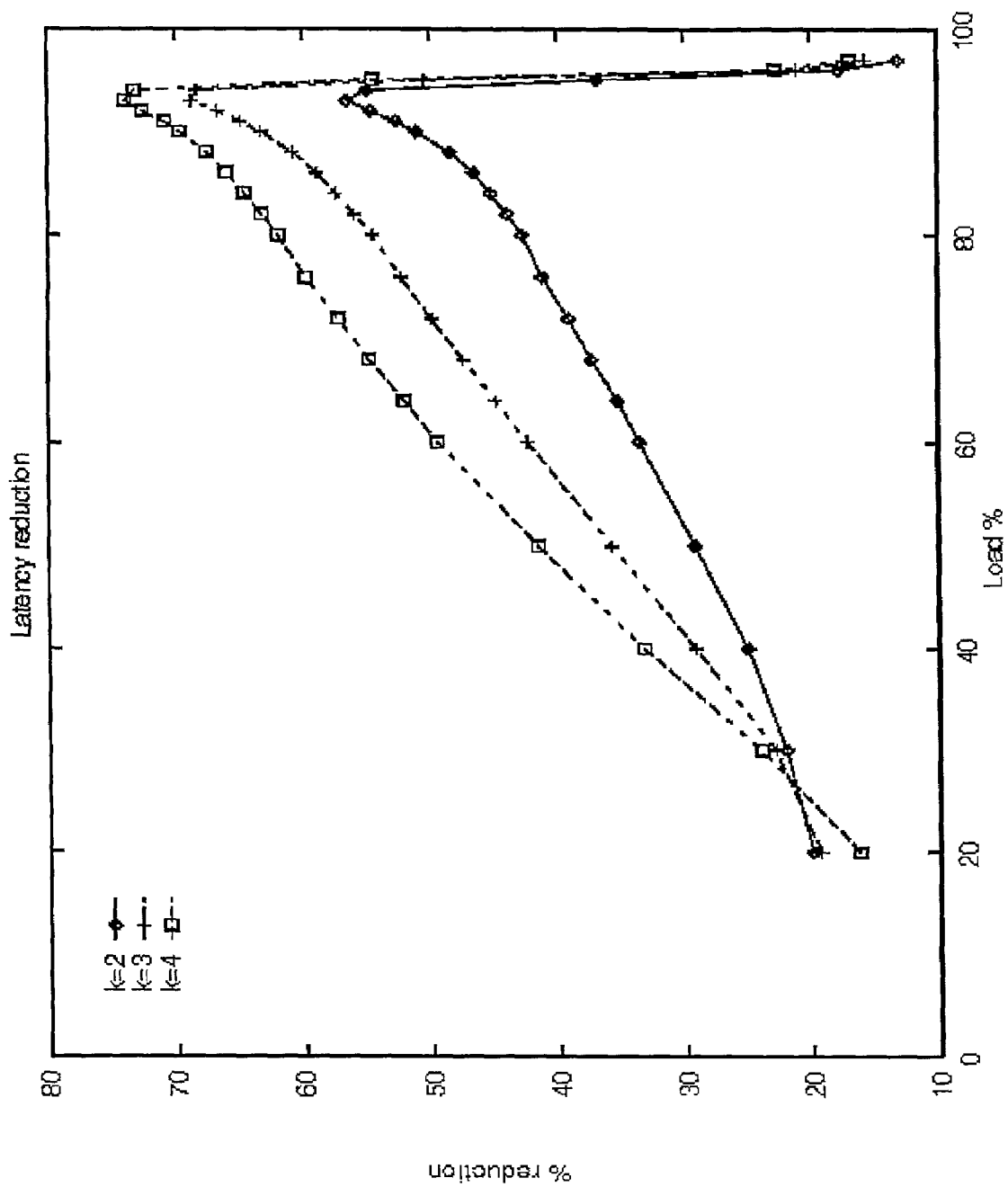
FIG. 4 shows a graph depicting latency improvements under simple traffic using the example implementation.
Figure 5:
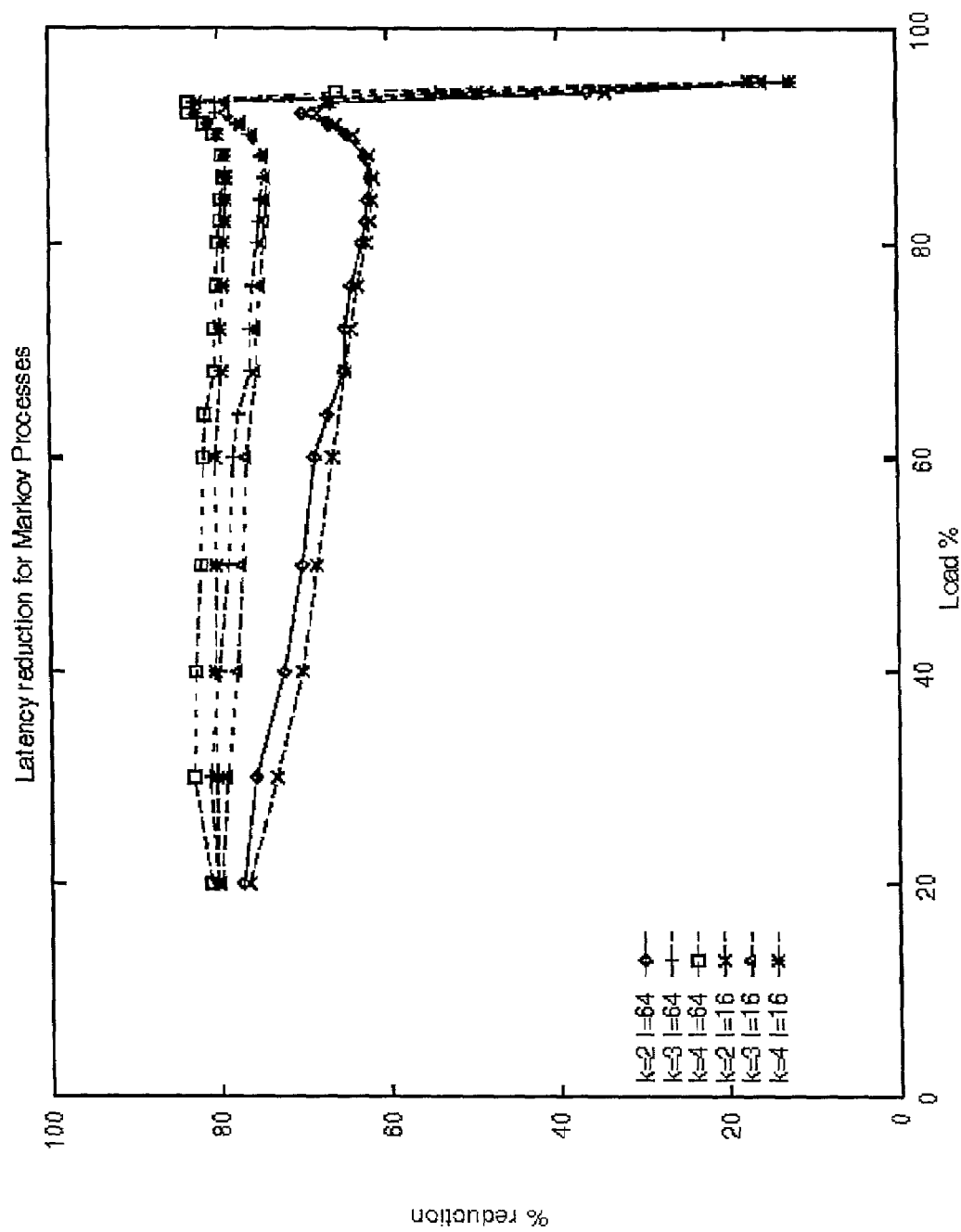
FIG. 5(a) shows a graph depicting latency improvements under bursty traffic for the example implementation.
FIG. 5(b) shows a graph depicting performance under overload on individual ports for the example implementation.
Figure 5:
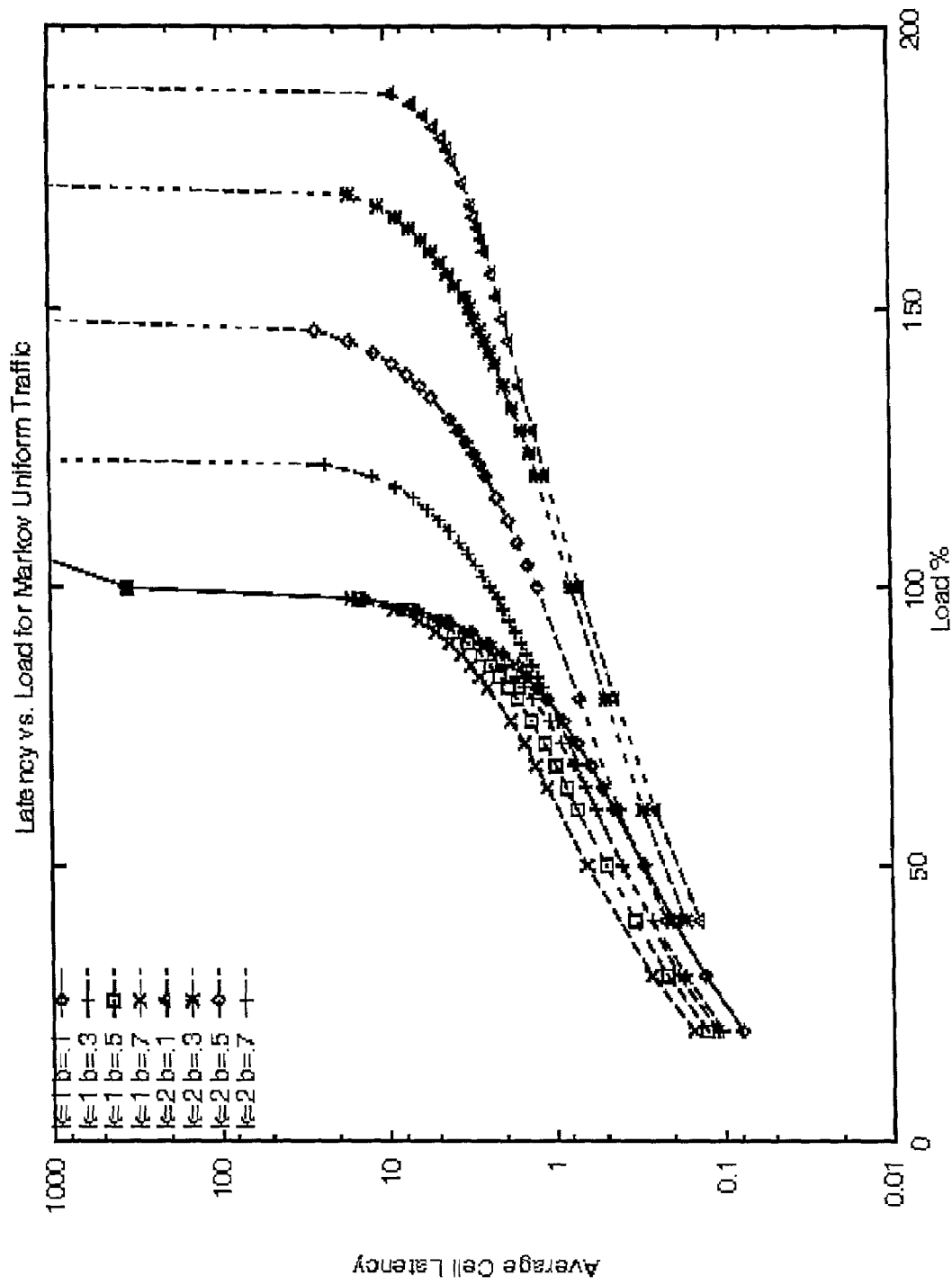

Adopting this approach provides several advantages. One is that of sub-dividing the problem into sub-problems that can be optimized separately. Another is that the new scheduler can reuse the existing crossbar scheduler designed and optimized for a particular traffic. FIG. 3 illustrates the corresponding scheduling flow for FLEXBAR. It's constituent steps are described below:

Step 1. For each request that comes in from the queue, generate $k^2$ requests for the different combination of the path that it can take. For example, if there is a request for a packet to be routed from port 5 to port 9, and if the flexibility of FLEXBAR is two, then re-quests are generated for crossbar port 5 to 9, 6 to 9, 5 to 10, 6 to 10 to indicate the possible paths through the crossbar this packet can travel through in order to get from input port 5 to output port 9.

Step 2. Then, the requests get recombined for the same route through the crossbar before being sent to the crossbar scheduler. For example, the scheduler would request a path through the crossbar from crossbar port 6 to port 10 if there are any requests from the router port 5 or 6 going to router port 9 or 10.

Step 3. The crossbar scheduler returns the scheduler for the crossbar configurations.

Step 4. The FLEXBAR scheduler then arbitrates the requests it has received from the different ports if the connection is granted. For example, if the crossbar scheduler granted access from crossbar pert 6 to 10, for the case of flexibility of two, this crossbar resource could be made available to the packet request going from router port 5 to 9, 6 to 9, 5 to 10, or 6 to 10, and FLEXBAR'S scheduler must make a decision to see which of these four requests gets the resource granted by the crossbar switch. Currently, FLEXBAR's scheduler gives highest priority to the request with the same port number as the crossbar port numbers (behaves like the traditional crossbar switch). In this way, the scheduler preserves the native property of the traditional scheduler such as free of starvation, fairness, etc. FLEXBAR's scheduler can also be modified so that it gives priority to certain higher priority packets or ports to support different QoS traffic instead.

4. Implications

The basic advantage of FLEXBAR is the increased flexibility that allows scheduling of certain requests that, hitherto, would be blocked. This can significantly lower the latency of the packet waiting in the queue at moderate loads. At low traffic loads, almost all requests can be scheduled immediately under the traditional crossbar design. Therefore, not much improvement may be expected here. Similarly, at high loads, almost all the available paths in the switch will already be utilized. Therefore, the increased flexibility in path selection may, again, not have the opportunity to generate new paths through the crossbar. However, at moderate loads, if a requested path is busy with another request, the new crossbar design will allow the packet to travel down another path through the crossbar switch. Thus, the utilization of the crossbar switch increases, resulting in lower latency and shorter queue lengths.

For a given desired packet drop rate, the link speed and the size of the queue buffer, the realistic input load a switch can handle can be determined <16>. FLEXBAR effectively increases the link speed of each port by using crossbar paths that are idle, thus it will increase the input load a switch can handle or decrease the packet drop rate at the same load.

The advantage of FLEXBAR is best evident in bursty type of traffic, which is common of traffic workloads seen to-day as the result of the way tcp/ip congestion control operates <16>. In a bursty traffic scenario, it is very likely that one path in a crossbar switch is high in demand, while at the same time, another path has very low traffic. In this situation, not only should the latency of the packet improve significantly, but also the throughput of each port that the router supports should increase. This is because ports that are exposed to bursty traffic can potentially use other ports that have low loads at the time. In this way, the number of packets that can be switched in a cycle from a given port increases.

FLEXBAR also improves the switch utilization when packets are multi-cast. In the traditional crossbar, if the output port corresponding one of the multi-cast packet's destinations is being used, the packet has no choice but to wait and get retransmitted from the same input port in the next cycle. However, in the FLEXBAR, the multi-cast packet can find another route from the same input port to the output port, thus utilizing the output flexibility that is available in this architecture.

The flexibility configuration algorithm can also be changed to place higher priority over certain ports or packets as a way to increase bandwidth based on Quality of Service (QoS) requirements. Hence, higher priority packets can always be allocated higher bandwidth than an individual crossbar path's bandwidth. Increasing the bandwidth for higher priority packets beyond 100% is not something that can be achieved with the traditional crossbar design.

By modifying the crossbar as proposed, it should be noted that the number of paths that can be scheduled for a particular request has been increased at a slight performance hit. The logic that performs the selection of the input and output packets is relatively more complicated than before. Additionally, the scheduling algorithm must now allow the packets to be routed through additional connections that were not available earlier. However, with the modifications being only local, the performance hit is minor compared to other schemes where packets can be pre-routed to all inputs.

I.C. Experiments, Analysis and Discussion

In this section, the empirical advantages of FLEXBAR with respect to a conventional crossbar are demonstrated and the tradeoffs analyzed. This section is divided into two sub-sections. Sub-section IV.C.1 describes the experimental methodology used in our work. Sub-section IV.C.2 presents the results of switch simulations that demonstrate the performance of FLEXBAR relative to a conventional crossbar under several relevant traffic scenarios. Sub-section IV.C.3 presents results from hardware implementation of FLEXBAR, including hardware overheads.

1. Experimental Methodology

Section IV.C.1($a$) presents the simulation flow for different traffic scenarios. Section IV.C.1($b$) discusses the overhead estimation for the new crossbar with respect to the old crossbar.

a) Traffic Simulations

Latency improvements for the example design using the disclosed techniques is analyzed herein under different traffic patterns for the new design. A C simulator SIM (further details of SIM can be found in http://klamath.stanford.edu/tools/SIM) is used for simulating the switch under different traffic scenarios. Modifications were made to the simulator to simulate the additional input and output flexibility of the FLEXBAR. The following traffic scenarios were considered:

(1) Simple Symmetric Traffic

The first case is that of a uniform traffic load with uniform port destinations. In each cycle, each input port has an equal probability of generating a packet to a random destination port. The latency vs. load curve is plotted for the traditional crossbar running the iSLIP algorithm. Then the same plot was generated with the input flexibility of two, three, and four. Maximum throughput was noted by considering the asymptotic behavior of the latency profile.

(2) Simple Asymmetric Traffic

For situations in which one port is heavily loaded than the non-heavily loaded ports, latency of the heavily loaded port vs. load under the condition of other ports having a load level that were 10%, 30%, and 50% of the load on the port of interest was studied.

(3) Bursty Traffic

The effect of FLEXBAR on latency under bursty traffic scenarios was also considered. The latency vs. load curves were generated for average burst length of 64 and 16. The heavily loaded port situation were also simulated with horny traffic by looking at the latency vs. load of one port while the other ports were maintaining 10%, 30%, 50%, 70% of the main port's traffic with bursty traffic patterns. The destination were uniformly distributed although all the packets from one burst were destined toward the same destination.

(4) Simple Asymmetric Traffic with Overload

In order to take advantage of the potential for higher than 100% throughput that can be achieved with the modified crossbar switch, the traffic must be generated at a higher rate. The simulation was modified so that the traffic was generated twice as often for the crossbar configuration that allow the flexibility of two. So the maximum load the simulation will simulate is 200% of the crossbar port rate. A test similar to the previous test is performed where one port is heavily loaded while the other ports have loads at a fraction of the heavy port in the case of uniform traffic. The input traffic simulation was prevented from going beyond 100% by allowing two cycles to generate packets for a router input port. The latency vs. load plot were plotted, and the maximum throughput for each traffic scenario extracted by considering where the latency reaches infinity.

b) Hardware Overheads

In order to support the changes to the crossbar architecture, overheads are incurred on two fronts: One is the overhead to the crossbar switch itself, the other is the overhead associated with changing the scheduling algorithm.

To measure the performance penalty associated with the change to the crossbar, an optimized version of the traditional 8-bit wide, 32×32 crossbar switch using Magic was laid out. Timing analysis was performed using SPICE with 0.35 □m technology. Then, for a FLEXBAR with flexibility of two, modifications were made in the layout so that it can support flexibility of two for each input and output port. The performance of the modified crossbar switch was then measured and the performance overhead was calculated based on the layout simulation. No extra pipelining stages were added for the new design. For the cases of flexibility of four and eight, simulation was done by modifying the extracted SPICE file to include the additional multiplexers that will be needed to support the higher flexibility input and output ports.

The overheads associated with the modified scheduler were measured. The iSLIP algorithm used in the Tiny-tera chip <13>was chosen as the baseline for the measurements. The algorithm for a 16-port scheduler written in VHDL and the circuit was synthesized using Design Compiler from Synopsys with options set to optimize for speed. Delay and area estimate were taken from the Design Compiler. The modified scheduler for FLEXBAR was also synthesized using the same compilation options. The delay and area estimate were recorded for flexibility of two, three, and four.

2. Simulation Results

For each test pattern scenario, latency was plotted. Latency is the amount of time a packet waits in a queue to be scheduled vs. the traffic load, or the percentage of the times a particular input port receives a request. The parameters that were varied are k, which is the flexibility of the crossbar switch; l. which is the burst length in a bursty scenario; and b, which is the background load as a percentage of the load associated with the port of interest. Also, percentage reduction in latency vs. load for different test scenario were plotted. Percentage reduction is calculated as:

(Latency in case of k=1–Latency in case of k>1)/Latency in case of k=1.

So 100% reduction implies that, with the modified switch, latency has been reduced to zero, and 0% reduction implies there is no difference in latency with the modified crossbar switch.

a) Simple Symmetric Traffic

Figure 6A:
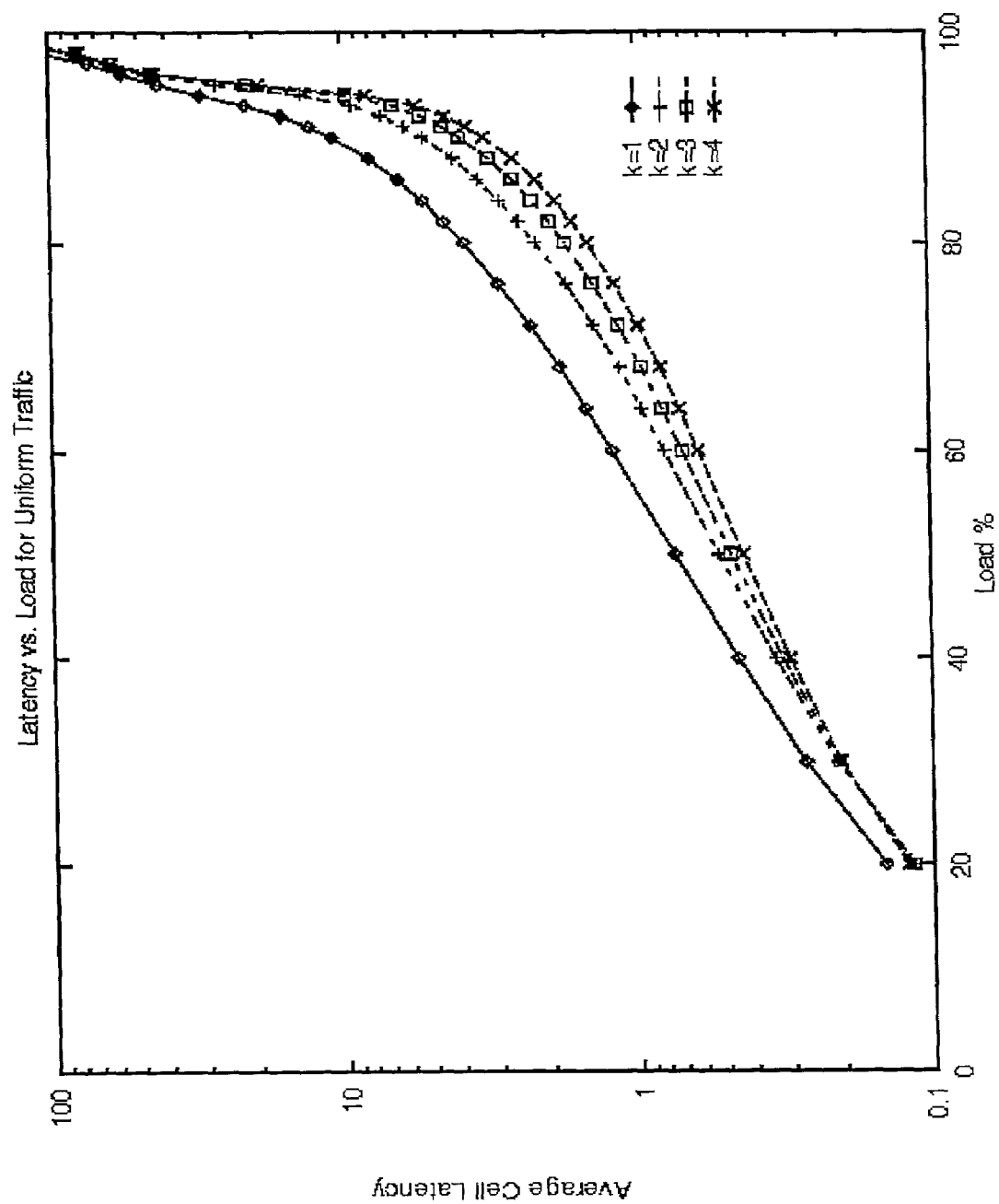
FIG. 6(a) shows a graph depicting latency characteristics for uniform traffic the example implementation.
Figure 6B:
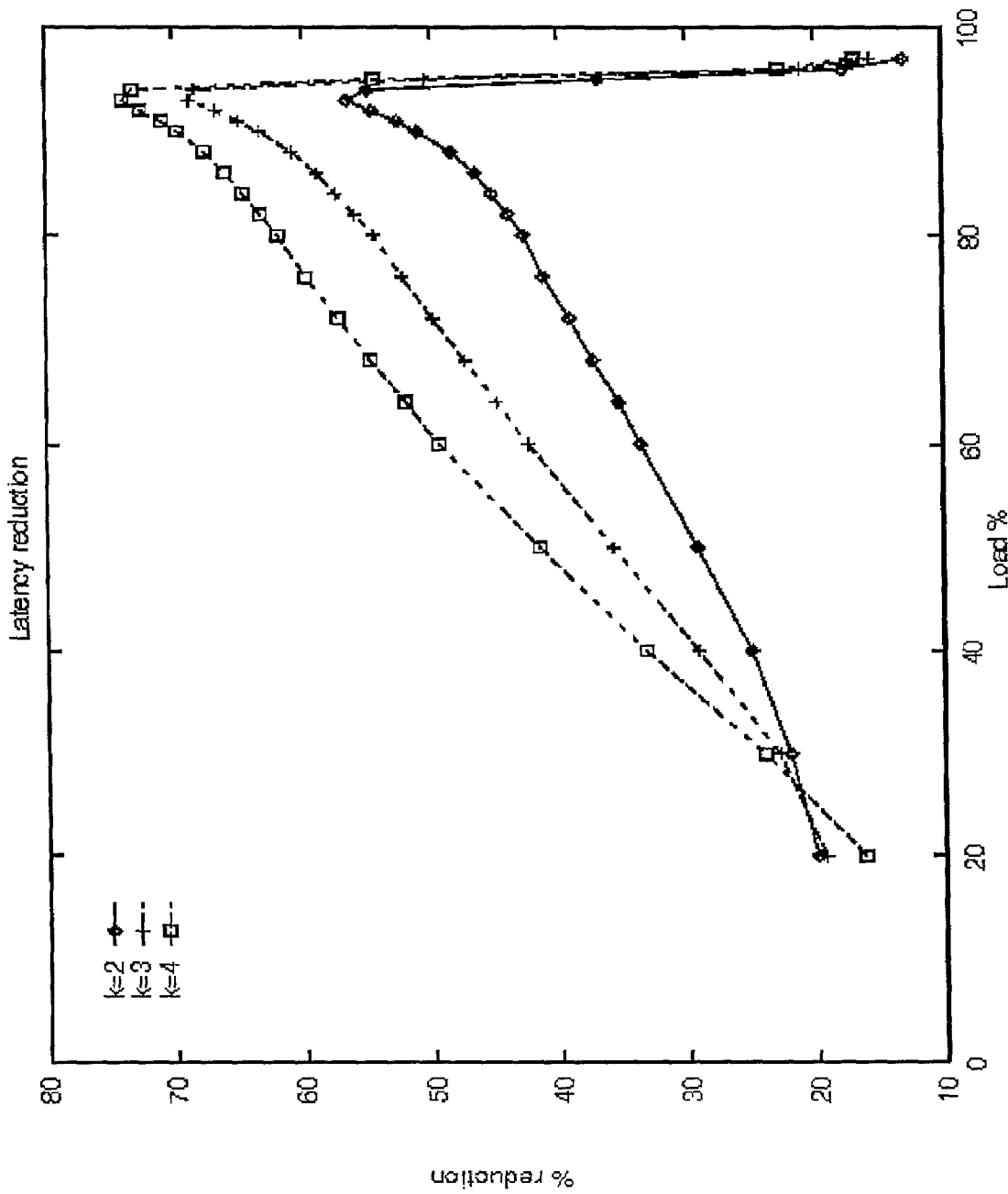
FIG. 6(b) shows a graph depicting improvements of a crossbar input port under uniform traffic for the example implementation.

As shown in FIG. 6(b), under evenly distributed traffic, by changing the flexibility of the crossbar to two, the latency reduced to 80% of the original latency level at 200% load to 46% under 93% load. At low loads, the 25% improvement isn't important as the latency values are already insignificantly low, but at higher loads, the improvement can make a difference in reducing the latency of the packet and thus also the packet drop rate. The improvement in the cases of higher flexibility is also shown in the figure.

b) Simple Asymmetric Traffic

Figure 7A:
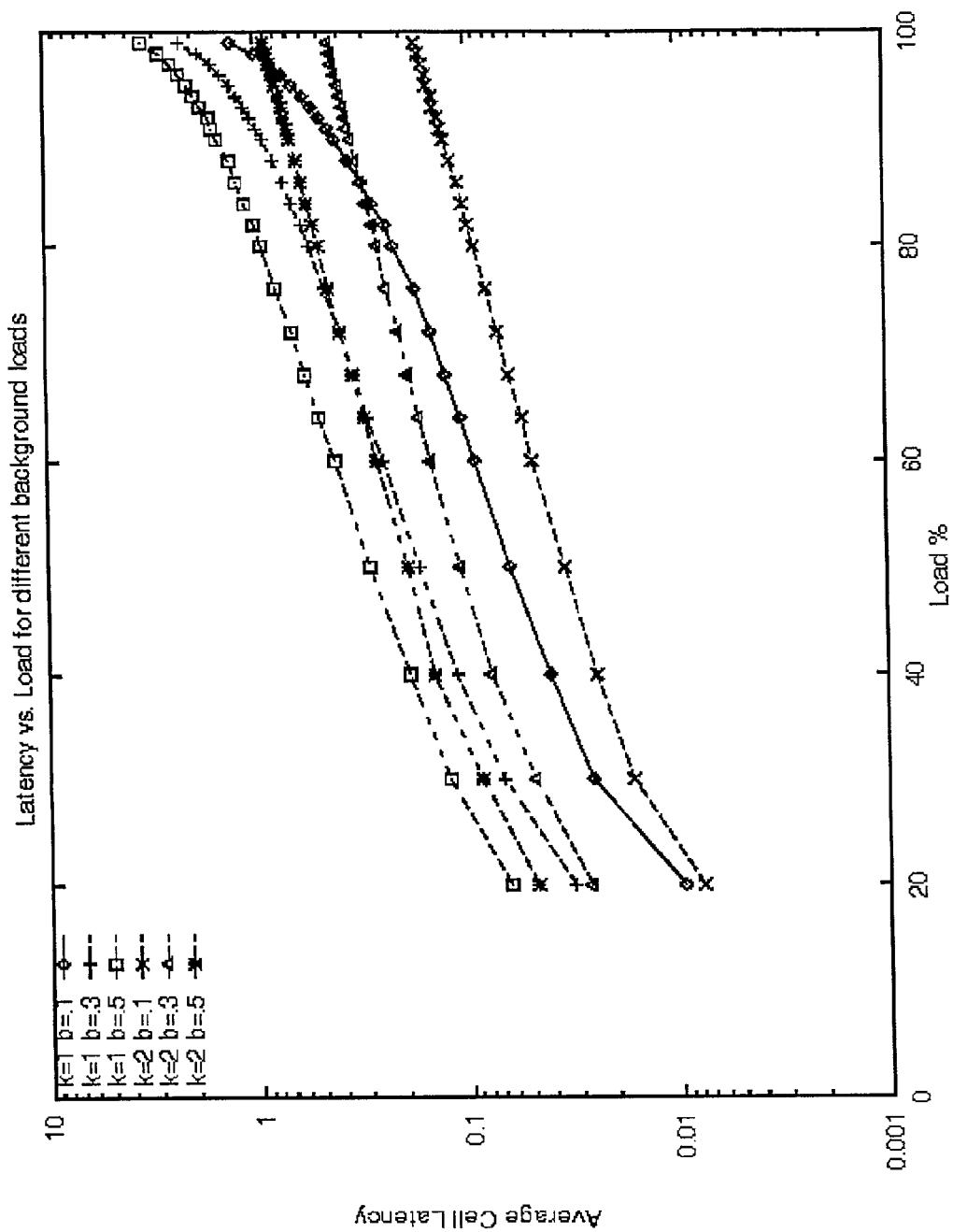
FIG. 7(a) shows a graph depicting latency characteristics for a crossbar input port under uniform traffic for the example implementation.
Figure 7B:
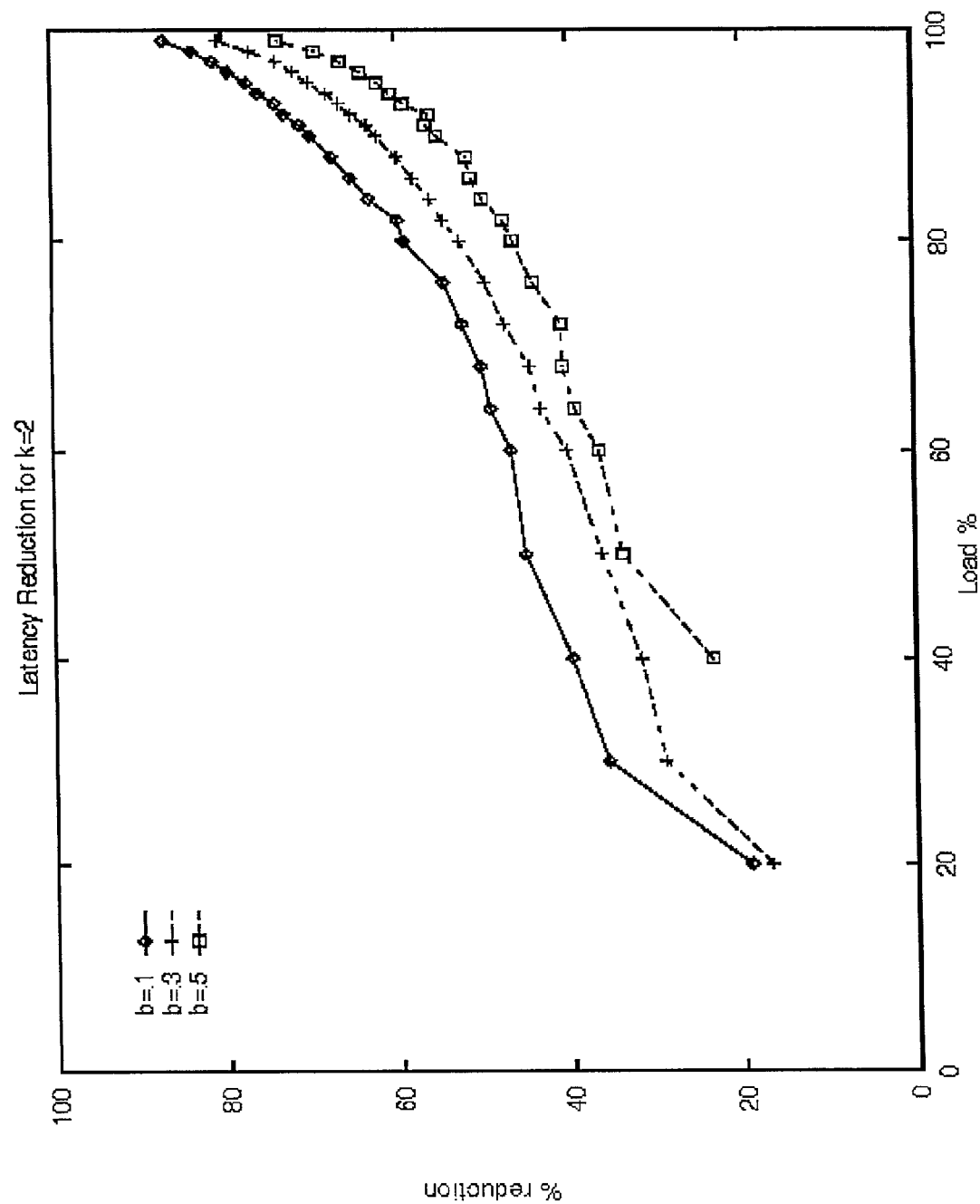
FIG. 7(b) shows a graph depicting improvement of a crossbar input port under uniform traffic for the example implementation.

The least amount of performance gain was expended with the normal uniformly distributed traffic pattern. Under the traffic scenario where one port is heavily loaded with uniform traffic while the other ports are less loaded, an even greater performance gain using the FLEXBAR is observed as shown in FIG. 7(b). In this scenario, it can be seen that the new architecture reduced the latency down to 14% of the original value when the port of interest is saturated and when die background traffic is low. Even if the background traffic has 50% of the traffic on the port of interest, at high traffic, the latency is still reduced to 27% of the original latency. The throughput in this kind of traffic for the port of interest should exceed by 100% if the ports can be made faster as is shown in later experiments.

c) Bursty Symmetric Traffic

Many of the network traffic are bursty in nature. The disclosed techniques improve the performance in bursty kinds of traffic scenarios. Simulation shows that under bursty traffic, the latency improvement is very good at all traffic loads until the traffic load is very high where the crossbar would already be full for the flexibility to be any useful. The improvement in performance is very similar for any burst length as long as the burst length is much greater than the flexibility of the crossbar. Simulation shows that the latency reduced to 30% to 40% of the original latency from low traffic load up to 90% load as shown in FIG. 8(c). The improvement drops at very high loads, but the router is not expected to be operating at such a high load anyway because the memory requirements to support such a high load with decent packet drop rate is very high.

d) Simple Asymmetric Traffic with Overload

This case is used to test the performance of the router port beyond 100% throughput. [The iSLIP algorithm, of which it is the basis for our algorithm can theoretically perform 100% throughput in uniform traffic conditions, we expect the FLEXBAR architecture can utilize 100% of the resources available * * * Anand please rewrite this sentence]. In another words, with a flexibility of two, the total throughput for both a heavy traffic port and a light traffic port combined would be 100%. Thus if the light traffic port is underutilized, the heavy traffic post will be able to take the rest of the bandwidth not taken by the light traffic port. Simulation shows that this is the case. When the background port only have 10% load, the heavy traffic port is able to achieve 190% throughput. And where the background port have 70% load, the heavy traffic port is able to achieve only 130% throughput as shown in FIG. 9.

3. Hardware Overheads

Table 1, shown in FIG. 11 shows the overheads (set up time, logic delay, and overall cycle times in ns) involved with the physical crossbar for flexibility (k) of 2, 4, and 8 over the traditional crossbar design (k=1) if no extra pipeline stages were allowed. In order to have a favorable tradeoff for the FLEXBAR design, the throughput for the traffic pattern we are interested in must increase by at least the amount of hardware overhead presented above. If the crossbar design is not the critical bottleneck of the network router or if pipeline stages are allowed, then the modification poses no performance degradation. The increase in latency by one clock cycle in the case of pipelined design can be more than made up in moderate traffic loads because flexibility introduced in the crossbar switch greatly improved the latency of the queue waiting time as shown in previous simulations.

Table 2, shown in FIG. 12, shows the overhead associated with the scheduling algorithm's hardware. For comparison, the crossbar core area is 100,000,000☐2. So even though the scheduler is much larger for the added flexibility, it is still small compared to the crossbar switch. It is also possible to put the extra overheads in the pipeline because of the way the scheduler is designed. However, extra pipeline stages will not help router performance because each scheduling operation depends on the result of the previous scheduling operation. In order to minimize the scheduling penalty, if the scheduler is the critical component in the router, one must increase the size of the packet being switched or one can simply accept it as a tradeoff for the higher bandwidth and lower latency achieved with the new architecture design.

Whether the tradeoff is worth the modification depends on the exact nature of the traffic pattern and the switch. The proposed crossbar modification is definitely a good trade-off in common traffic scenarios (moderately heavy, bursty traffic, or non-uniform traffic patterns) and also in switches with small input queues.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A crossbar switching fabric comprising:
   a plurality of crossbar input ports and
   a plurality of crossbar output ports,
   wherein traffic from at least one source is directed to more than one of said plurality of crossbar input ports, and
   wherein traffic from more than one crossbar output port is directed to at least one destination
   wherein k×k' requests are generated for each routing request coming from an input source, wherein k corresponds to a level of flexibility offered by the crossbar switch and k' is greater than 1 and less than or equal to k.

2. The crossbar switching fabric of claim 1, wherein an input flexibilty layer is inserted between the traffic sources the crossbar input ports.

3. The crossbar switching fabric of claim 1, wherein an output flexibilty layer is inserted between the traffic destinations and the crossbar output ports.

4. The crossbar switching fabric of claim 1, wherein if $src_i$ represents one source and $inp_i$ are plurality of inputs corresponding to the plurality of input ports, then traffic is directed in such a way that $src_i$ is directed to all inputs corresponding to $inp_i \ldots inp_{i+k}$.

5. The crossbar switching fabric of claim 4, wherein if i+k exceeds the number of inputs, ten traffic is wrapped around by redirecting traffic intended for inputs corresponding to i+k that exceed the number of inputs to inputs 1 . . . i.

6. The crossbar switching fabric of claim 1, wherein if $src_i$ represents one source and $inp_i$ are the plurality of inputs corresponding to the plurality of input ports, n represents the number of inputs, then traffic is directed in such a way that $src_i$ is directed to all inputs corresponding to $inp_i \ldots inp_{max(i+k,n)}$.

7. The crossbar switching fabric of claim 6, wherein sources ports known to have less traffic are designated to be last n−k+2 sources, where n is a number of sources.

8. The crossbar switching fabric of claim 4, wherein the fabric comprises an input flexibility layer including at least one multiplexer connected to one of the plurality of input ports.

9. The crossbar switching fabric of claim 4, wherein the fabric comprises an input flexibility layer including at least one multiplexer connected to one of the plurality of input ports.

10. The crossbar switching fabric of claim 8, wherein the multiplexer is a tri-state buffer.

11. The crossbar switching fabric of claim 9, wherein the multiplexer is a tri-state buffer.

12. The crossbar switching fabric of claim 8, wherein flexibility is implemented by varying a size of the multiplexer.

13. The crossbar switching fabric of claim 9, wherein flexibility is implemented by varying a size of the multiplexer.

14. A method of scheduling for a flexible crossbar switch comprising:
   a) generating $k^2$ requests for each routing request coming from an input source, wherein k corresponds to d level of flexibility offered by the crossbar switch;
   b) recombining requests for a same route;
   c) sending requests to a crossbar scheduler, and
   d) arbitrating requests from different ports making a request if a connection corresponding to the request is granted.

15. The method of claim 14 wherein a priority scheme is used in arbitrating.

16. The method of claim 15, wherein the priority scheme takes into account a quality of service required.

* * * * *

UNITED STATES PATENT AND TRADEMARK OFFICE
CERTIFICATE OF CORRECTION

PATENT NO. : 7,173,906 B2
APPLICATION NO. : 10/097582
DATED : February 6, 2007
INVENTOR(S) : Srivaths Ravi It is certified that error appears in the above-identified patent and that said Letters Patent is hereby corrected as shown below:

Col. 14 line 22 (Claim 9) delete "input", insert --output--
    Examiner's Amendment: 8-6-06 p. 5, claims 9, line 3

Signed and Sealed this

Twenty-sixth Day of August, 2008

JON W. DUDAS
*Director of the United States Patent and Trademark Office*